No. 676,740. Patented June 18, 1901.
P. FARINI.
CALCULATING OR LIKE SCALE.
(Application filed Mar. 18, 1899.)

(No Model.) 3 Sheets—Sheet 1.

Witnesses:

Inventor.
Placidia Farini
By Wm E. Soulter,
Attorney

No. 676,740. Patented June 18, 1901.
P. FARINI.
CALCULATING OR LIKE SCALE.
(Application filed Mar. 18, 1899.)
(No Model.) 3 Sheets—Sheet 2.

Witnesses

Inventor
Placidia Farini,
By Wm. E. Boulter,
Attorney

No. 676,740. Patented June 18, 1901.
P. FARINI.
CALCULATING OR LIKE SCALE.
(Application filed Mar. 18, 1899.)

(No Model.) 3 Sheets—Sheet 3.

Witnesses: Inventor
Placidia Farini
By Wm. E. Boulter,
Attorney

UNITED STATES PATENT OFFICE.

PLACIDIA FARINI, OF ROME, ITALY.

CALCULATING OR LIKE SCALE.

SPECIFICATION forming part of Letters Patent No. 676,740, dated June 18, 1901.

Application filed March 18, 1899. Serial No. 709,654. (No model.)

*To all whom it may concern:*

Be it known that I, PLACIDIA FARINI, a subject of the King of Italy, residing at Rome, in the Kingdom of Italy, have invented Improvements in or Relating to Calculating or Like Scales, (for which I have obtained Letters Patent in the Kingdom of Italy, dated August 19, 1898, No. 49,015,) of which the following is a specification.

The present invention relates to a triangular scale for drawing purposes which provides a means of graphically solving several geometrical problems of practical importance to engineers, architects, mathematicians, designers, students, and others.

Figure 1:
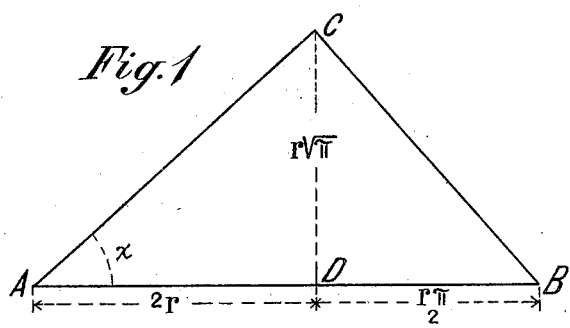
Figure 2:
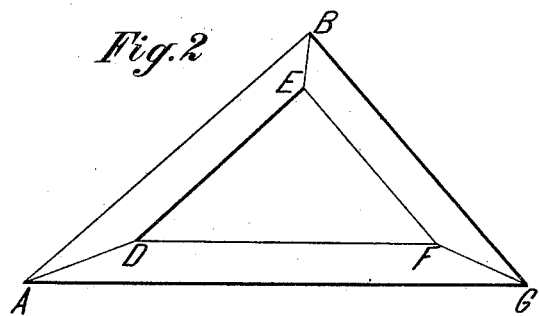
Figure 3:
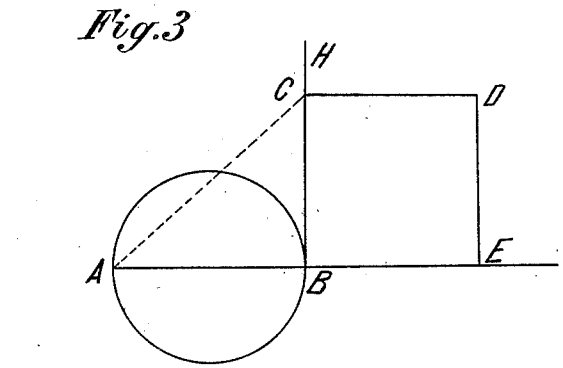
Figure 4:
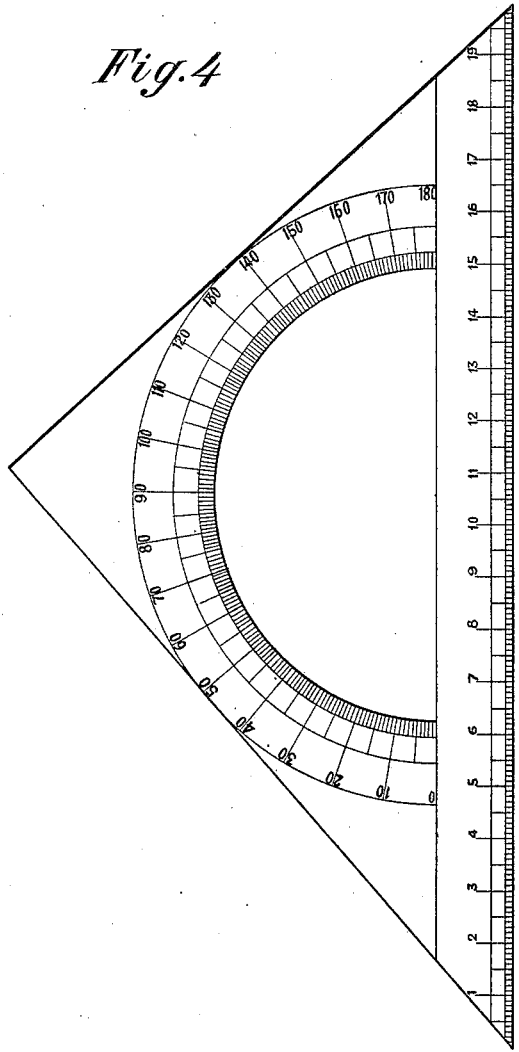
Figure 5:
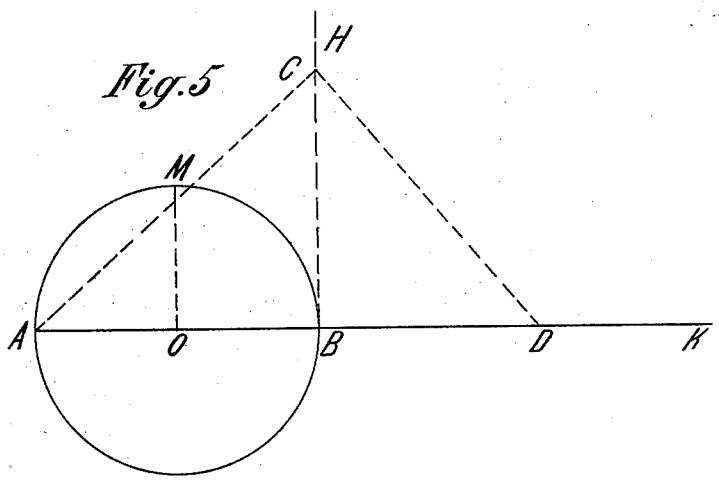
Figure 6:
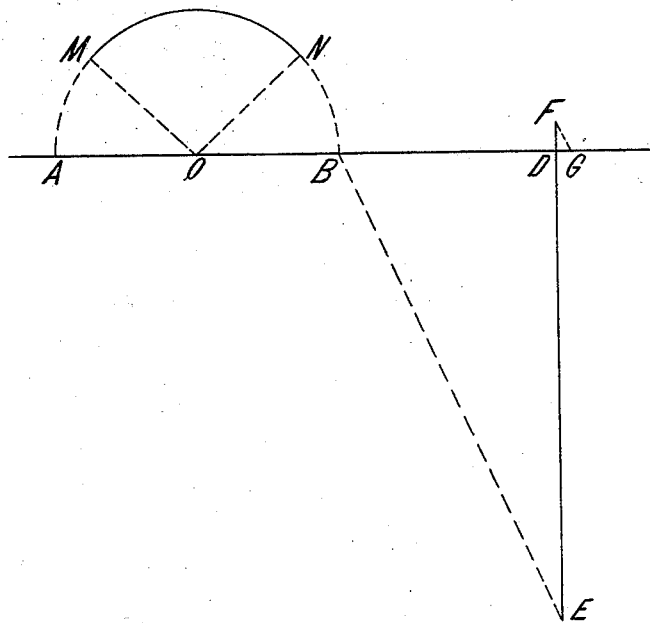

Figure 1 is a schematic view of a right-angled scalene triangle constructed in accordance with my invention. Fig. 2 is an elevation of one form of my improved triangular scale. Fig. 3 is a schematic illustration of a method of squaring a circle of any radius. Fig. 4 is an elevation of a form of my improved scale provided along the hypotenuse side with a scale and within the inner space with a goniometer. Fig. 5 is a schematic view illustrating the method of finding the length of a quadrant of the circumference. Fig. 6 is a schematic view showing the method of finding the length of any arc.

The scale essentially consists of a scalene right-angled triangle the three sides of which are to each other in a certain ratio, which ratio is characterized by the fact that the projections of the two catheti or sides containing the right angle on the hypotenuse taken as base and the height of the triangle relatively to the hypotenuse are to each other as the three quantities which represent the diameter of a circle, ($2r$,) the fourth part of the circumference of the same circle $\frac{(r\pi)}{2}$ and the side of a square the area of which is equal to the area of the same circle $r\sqrt{\pi}$, taking for practical purposes the value of $\pi$ to be equal to 3.14159. This relation forms the principle of the invention, and having thus established a relation of measure between rectilineal elements, (height of triangle, projection of the greater cathetus,) with circular elements rectified, (fourth part of a circumference or quadrant,) one can now easily by means of this scale transform graphically given rectilineal segments into curvilineal equivalents, and vice versa.

In the schematic view represented by Fig. 1 of the accompanying drawings A B C is a right-angled triangle with the right angle at C, in which $AD = 2r$—*i. e.*, the diameter. The height $CD = r\sqrt{\pi}$, or $$r\sqrt{3.14159} = r \times 1.772453,$$

(taking $\pi$ to be equal to 3.14159,) from which it follows that B D is equal to $r\frac{\pi}{2}$—*i. e.*, to the fourth part of a circle the radius of which is $r$, since $$AD \times BD = CD^2,$$

or in this case $$2r \times BD = (r\sqrt{\pi})^2,$$

and consequently $$BD = \frac{(r\sqrt{\pi})^2}{2r} = \frac{r^2\pi}{2r} = \frac{r\pi}{2}.$$

In this triangle A B C, if an arbitrary value is given to any of the rectilineal elements A B, C B, D B, A D, A C, C D, the value of each of the remaining elements is fixed, and it is evident that, in consequence of the known geometrical and trigonometrical relation existing in triangles of this construction, one can express in a great variety of ways the relations between the elements of this special triangle. For instance, the form of the calculating-scale being similar to a special scalene triangle, in which, if we call $x$ the angle contained by the hypotenuse and the greater cathetus, $$\text{Sin. } x \text{ should be} = \sqrt{\frac{\pi}{4+\pi}} \text{ or tg. } x = \sqrt{\frac{\pi}{4}},$$

Or, again, in the right-angled scalene triangle, if the angle contained by the hypotenuse and the smaller cathetus be called $\beta$, then $$\text{Sin. } \beta = \frac{2}{\sqrt{\pi+4}}, \text{ or tg. } \beta = \frac{2}{\sqrt{\pi}},$$

or, again, dividing the three elements $2r$, $\frac{r\pi}{2}$, and $r\sqrt{\pi}$ by $2r$, $$AD:DB:CD = 1:\frac{\pi}{4}:\frac{\sqrt{\pi}}{4},$$

or, again, the sides containing the right angle are to each other as $2:\sqrt{\pi}$, or, bearing in mind that the value of $\pi$ has been fixed at 3.14159, as 2 : 1.772453.

I will now describe the operation by which the values just above mentioned are obtained.

It is known that in a right-angled triangle the height with respect to the hypotenuse is the proportional average between the segments in which the foot of the height divides the hypotenuse. In the present case (1)     $AD : CD = CD : DB$.

Consequently (2)     $AD \cdot DB = CD^2$.

Having taken for AD the value $2r$ and for CD the value $r\sqrt{\pi}$, we have, in substituting these values in the formula (2), $$2r \cdot DB = (r\sqrt{\pi})^2,$$

and in developing $$BD = \frac{(r\sqrt{\pi})^2}{2r} = \frac{r^2 \pi}{2r} = \frac{r \pi}{2}.$$

In the triangle indicated in Fig. 1 $x$ is the angle $C(A)B$. In this right-angled triangle

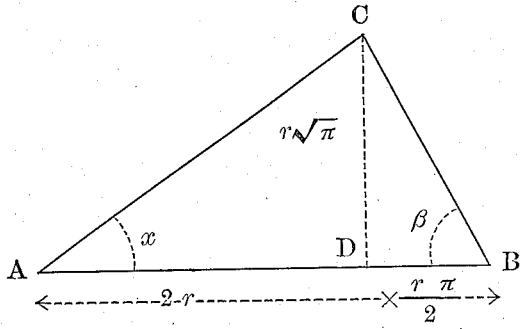

$$\text{Sin. } x = \frac{\sqrt{\dfrac{4r^2\pi + r^2\pi^2}{4}}}{\dfrac{4r + r\pi}{2}} = \frac{\sqrt{4r^2\pi + r^2\pi^2}}{4r + r\pi} = \frac{r\sqrt{4\pi + \pi^2}}{r(4+\pi)} =$$

$$\frac{\sqrt{4\pi + \pi^2}}{4+\pi} = \frac{\sqrt{(4+\pi)\pi}}{4+\pi} = \frac{\sqrt{4+\pi}\sqrt{\pi}}{4+\pi} = \frac{\sqrt{\pi}}{\sqrt{4+\pi}} = \sqrt{\frac{\pi}{4+\pi}}.$$

Analogously, being, as known, $$CB = AC \text{ tang. } x,$$

and consequently $$\text{Tang. } x = \frac{\sqrt{r^2\pi + \dfrac{r^2\pi^2}{4}}}{\sqrt{r^2\pi + 4r^2}} = \frac{\sqrt{\dfrac{4r^2\pi + r^2\pi^2}{4}}}{\sqrt{r^2\pi + 4r^2}} = \sqrt{\frac{4r^2\pi + r^2\pi^2}{4(r^2\pi + 4r^2)}} = \sqrt{\frac{4r^2\pi + r^2\pi^2}{4r^2\pi + 16r^2}}.$$

But the part under the root is an exact quotient. Indeed, $$(4r^2\pi + 16r^2)\frac{\pi}{4} = r^2\pi^2 + 4r^2\pi.$$

Thus $$\text{Sin. } x = \sqrt{\frac{\pi}{4+\pi}}.$$

This is proved as follows: It is known that in any right-angled triangle one cathete is equal to the hypotenuse multiplied with the sinus of the angle opposite to the considered cathete. In the present case we, therefore, have $$CB = AB \cdot \sin. x,$$

and in substituting the values taken for AB as sum of the two segments in which AB is divided by the perpendicular taken down from C $$CB = \left(2r + \frac{r\pi}{2}\right) \sin. x.$$

But CB is the hypotenuse of a right-angled triangle the cathetes of which have the values $r\sqrt{\pi}$ and $\dfrac{r\pi}{2}$. Consequently for the theorem of Pythagoras $$\sqrt{r^2\pi + \frac{r^2\pi^2}{4}} = \left(2r + \frac{r\pi}{2}\right)\sin. x,$$

and in dividing $$\text{Sin. } x = \frac{\sqrt{r^2\pi + \dfrac{r^2\pi^2}{4}}}{2r + \dfrac{r\pi}{2}},$$

and in taking away the divisors $$\text{Tang. } x = \frac{CB}{AC},$$

in putting for CB and AC their respective values $$\text{Tang. } x = \sqrt{\frac{\pi}{4}}.$$

Analogously, being $$AC = AB \sin. \beta,$$

and consequently $$\text{Sin. } \beta = \frac{AC}{AB}.$$

$$\text{Sin. } \beta = \frac{\sqrt{4r^2 + r^2\pi}}{2r + \dfrac{r\pi}{2}} = \frac{\sqrt{4r^2 + r^2\pi}}{\dfrac{4r + r\pi}{2}} = \frac{2\sqrt{4r^2 + r^2\pi}}{4r + r\pi} = \frac{2r\sqrt{4+\pi}}{r(4+\pi)} = \frac{2\sqrt{4+\pi}}{\sqrt{4+\pi}\sqrt{4+\pi}} = \frac{2}{\sqrt{4+\pi}};$$

*i. e.*, $$\text{Sin. } \beta = \frac{2}{\sqrt{4+\pi}}.$$

At least, $$AC = CB \text{ tang. } \beta.$$

Thus $$\text{Tang. } \beta = \frac{AC}{CB};$$

*i. e.*, the inverse value of tang. *x*. Thus $$\text{Tang. } \beta = \frac{1}{\text{tang. } x} = \sqrt{\frac{4}{\pi}} = \frac{\sqrt{4}}{\sqrt{\pi}} = \frac{2}{\sqrt{\pi}}.$$

Thus $$\text{Tang. } \beta = \frac{2}{\sqrt{\pi}}.$$

Having explained the theoretical principle of the scale, some of the uses to which it can be applied will now be explained.

The calculating-scale in its simplest form is a triangle like an ordinary drawing triangle A B C, Fig. 2, made of wood, metal, celluloid, glass, or any other convenient material, the central portion of which is cut out, so as to form another similar but smaller triangle D E F. This scale may be made use of as an ordinary drawing triangle; but it may be used as a calculating instrument for the rectification of curves to express in squares the magnitude of plane surfaces limited by curves and also that of curved surfaces of the first degree so far as they are functions of a circle, and for use in the construction of special ornamental curves, among others in that of the volute in the Ionic capital, all the operations being carried out graphically and with a rapidity much greater than can be attained by ordinary methods. The accuracy, too, of the work is very high, seeing that it depends on the value of $\pi$, which has been so fixed as to render it practically the maximum as compared with other means employed. In fact, the error amounts to rather less than one-millionth part.

The method of solving several problems of importance, to which the scale is readily adapted, will now be described.

*Method of squaring a circle of any radius r.* (See Fig. 3.)—Let A B be the diameter of the given circle. A rule or straight-edge is placed along the line or diameter A B and at B draw a line B H perpendicular to A B. Still keeping the rule along the diameter A B, place the scale with its greater cathetus against the rule and slide it along the latter until the hypotenuse of the scale triangle reaches the point A. Mark the point C, in which the hypotenuse in this position intersects the perpendicular. Then B C will represent the side of a square the area of which will be found to be equal to the area of the given circle up to the desired limit of accuracy, for since the two catheti are to each other as $2 : \sqrt{\pi}$, if one, as is the case in this problem, is of the length of A B = 2 *r* the other must be $r\sqrt{\pi}$, of which the square is $r^2 \pi$, which is precisely the area of a circle the diameter of which is 2 *r*.

*To rectify or find the length of a quadrant of a circumference.* (See Fig. 5.)—Let M B be the quarter of a circle which is to be rectified. Place a rule or straight-edge along the diameter A B. At B erect a line B H perpendicular to A B. Now place the calculator-scale with its hypotenuse against the rule still held against the line A B, so that the larger cathetus is to the left, and slide it along the rule until the larger cathetus reaches the extremity A of the diameter A B, cutting the perpendicular B H at a point C. Now slide the scale back, while still holding the rule firmly in its original position, until the lesser cathetus, which is to the right, passes through the said point C, cutting the prolongation of the diameter A B at a point D. Then B D will be the length of the quarter-circle B M, and twice B D will be equal to the length of half the circle, and four times B D the length of the whole circle.

*To find the length of any arc.* (See Fig. 6.)—Given the angle of an arc M N as ninety-five degrees and the radius M O. Find the center O, which will be the point of intersection of two perpendiculars drawn from the center of any two chords of the arc given and complete the semicircle A M N B. Having recourse to the solution of the preceding problem, taken on the prolongation of the diameter A B, a length B D equal to the length of a quarter of the circle of which the arc M N forms a part, from D draw a line D E in any direction and make D E equal to ninety millimeters and join E with B. Now on E D fit the point D. Add as many millimeters D F as are necessary to make the length E F equal to the number of degrees in the arc, in this case ninety-five, (fractions of degrees may safely be estimated or marked by sight in proportional lengths of a millimeter,) which will give the point F. Through F draw F G parallel to B E, giving the point G. B G will be the length of the arc M N within the desired limits of accuracy.

My invention will be found to be applicable to many other uses. It will be seen, therefore, and from the example given that the scale is of very great practical utility for assisting the work of geometrical calculations. It may also be remarked that the inner space, as shown in Fig. 4, may be out, so as to represent a goniometer or angle-calculator and double decimeter or other scale may be marked along the hypotenuse side of the triangle. This arrangement renders it possible to draw lines at an angle of forty-five degrees, which would be impossible with the triangle alone, not being an isosceles triangle, as well as to draw lines at any other inclination, which is of very great help to a draftsman.

Having now particularly described and ascertained the nature of my said invention and in what manner the same is to be performed, I declare that what I claim is—

1. A scale or instrument for use in drawing and graphic calculations having the form of a right-angled scalene triangle, in which the projection of one cathetus of the triangle on the hypotenuse, is equal to the diameter $2r$, of a circle, and the height of the triangle, the hypotenuse being taken as the base, is equal to the side $r\sqrt{3.14159}$, of a square exactly equal to the surface of the circle $3.14159\ r^2$, and the projection of the other cathetus of the triangle, on the hypotenuse being equal in length to the fourth part of the same circle, viz: $\dfrac{3.14159\ r}{2}$.

2. A scale or instrument for use in drawing and graphic calculations having the form of a right-angled scalene triangle in which the projection of one cathetus of the triangle on the hypotenuse is equal to the diameter $2r$ of a circle, and the height of the triangle, the hypotenuse being taken as the base, is equal to the side $r\sqrt{3.14159}$, of a square exactly equal to the surface of the circle $3.14159\ r^2$, and the projection of the other cathetus of the triangle on the hypotenuse being equal in length to the fourth part of the same circle, viz: $\dfrac{3.14159\ r}{2}$ and said triangle being provided on the edge with a scale and in the central part with a goniometer, all as set forth.

In witness whereof I have hereunto set my signature in the presence of two witnesses.

PLACIDIA FARINI.

Witnesses:
 G. W. ZANARD,
 OERISTODEMO RAGGI.